April 8, 1952     E. E. BROWN     2,592,387
SHAFT BEARING STRUCTURE
Filed July 1, 1948     2 SHEETS—SHEET 1

INVENTOR.
Earl E. Brown
BY
ATTORNEYS.

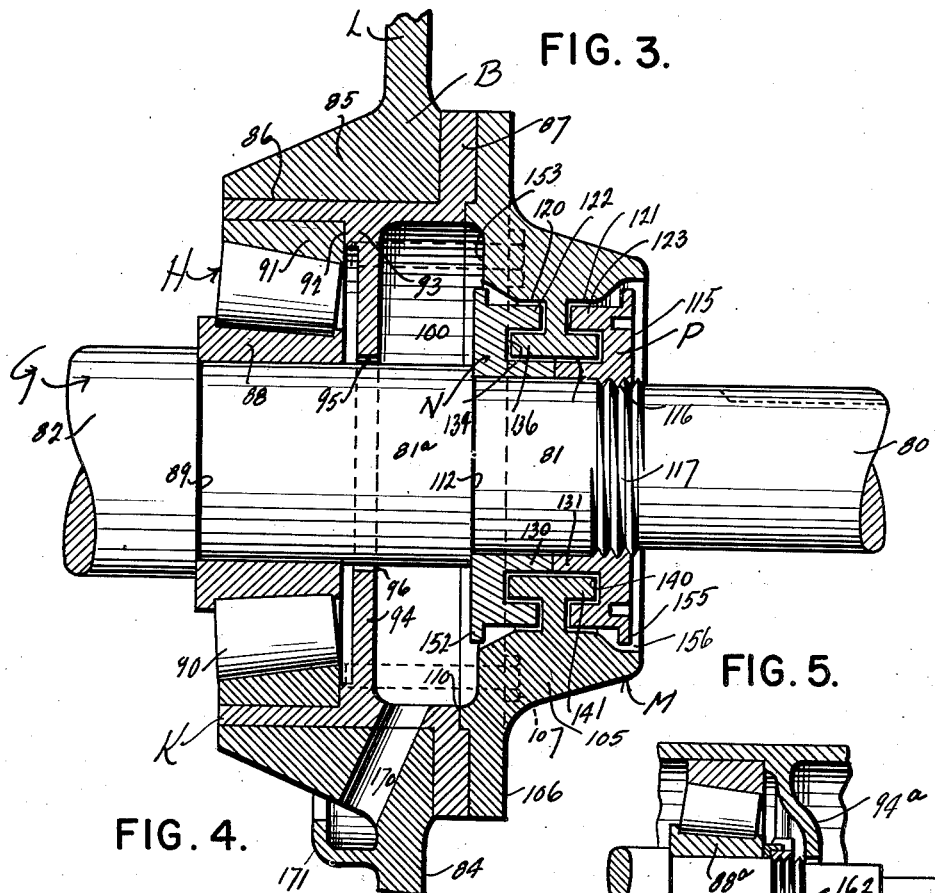

UNITED STATES PATENT OFFICE 2,592,387

SHAFT BEARING STRUCTURE

Earl E. Brown, Camden, N. J., assignor of one-half to George A. Streitz, Camden, N. J.

Application July 1, 1948, Serial No. 36,471

19 Claims. (Cl. 308—187.1)

1

This invention relates to improvements in shaft bearing structures.

The primary object of the invention is the provision of an improved bearing arrangement for shafts having improved means to prevent access of external liquids, etc. to the bearing structure.

A further object of this invention is the provision of an improved bearing structure for shafts having improved lubricant sealing means associated therewith.

A further object of this invention is the provision of an improved bearing structure for pump shafts having improved means associated therewith to prevent loss of lubricant and to prevent access of external liquids and debris, such as acids, etc. to the bearing structure.

A further object of this invention is the provision of an improved oil seal construction for reduction gear and high speed transmission shaft bearings.

Other objects and advantages of this invention will be apparent during the course of the following detailed description.

In the accompanying drawings, forming a part of this specification, and wherein similar reference characters designate corresponding parts thruout the several views, Figure 1 is a cross sectional view taken thru an improved structure for shafts, such as are generally associated with pumps, showing the improved labyrinth structure for excluding external liquids, such as acids, etc. from the bearing and lubricating portions of the structure.

Figure 3 is a cross sectional view taken thru a bearing structure for the drive shafts of reduction gearing and high speed transmissions, showing improved bearing supporting means, and improved labyrinth type means for controlling lubricant and excluding access of foreign materials to the bearing structure.

Figure 4 is a fragmentary end elevation of the bearing structure.

Figure 5 is a modified form of invention.

Figure 1:
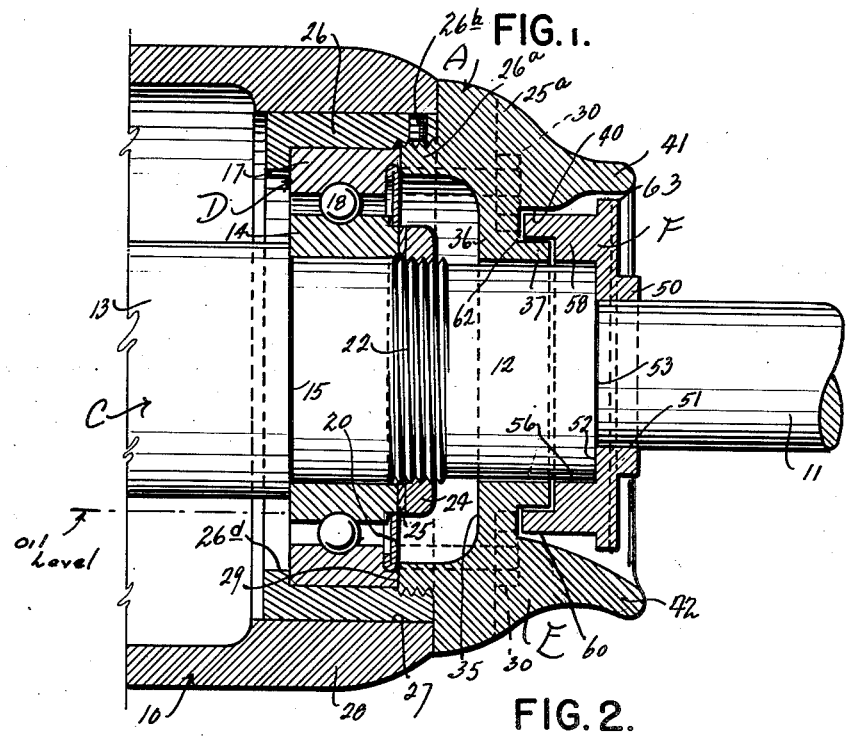

In the accompanying drawings, forming a part of this specification, and wherein are shown different forms of the invention, the letter A may generally designate an improved type of bearing structure adapted for association with pumps and the like, and B may indicate an improved bearing structure for use in connection with drive shafts of reduction gearing, and transmission mechanism.

It is well known that in connection with the pumping of such fluids as acids, sometimes the acid will creep along the shaft and enter the bearing housing with destructive results. While I do not intend myself to be limited to any particular type of bearing housing structure for supporting the pump shaft, the type shown in Figures 1 and 2 of the drawings anticipate the use of a housing 10 having a rear supporting single shield bearing (not shown) associated therewith for supporting the shaft C. The invention resides in the improved front bearing structure A, shown in Figures 1 and 2.

The shaft C includes a pump shaft portion 11, the intermediate shaft portion 12 and the bearing shaft extension 13, which are of successively greater diameter. The bearing proper D is located on the shaft portion 12 and includes an inner race 14 engaging against the shoulder 15 at the juncture of the shaft portions 12 and 13. It furthermore includes an outer race 17 and the ball bearings 18 between the races. The bearing D is of the single shield type, the shield 20 of which faces the front bearing cap in order to prevent loss of lubricant. The portion 12 of the shaft is threaded at 22 for receiving a lock nut 24 which clamps a lock washer 25 against the inner race. The threading is counter to the direction of shaft rotation.

An improved bearing cap E is provided as part of the front bearing structure including the external body portion 25$^a$ which has an externally threaded hub 26$^a$ for receiving a sleeve portion 26 adapted to fit in the passageway 27 of the end portion 28 of the housing 10. The end 28 is enlarged to detachably but snugly receive the sleeve portion 26 therein. The hub 26$^a$ is provided with a right angled shoulder 29 lying in a plane to the axis of the shaft which abuts against the outer race 17 to hold it in position. The sleeve 26 has an inner flanged extension 26$^d$ to hold the outer race in position. Sleeve 26 is locked in position upon the hub 26$^a$ by means of a hollow head set screw 26$^b$. The body portion 25$^a$ of the cap E is provided with a plurality of openings for receiving attaching cap screws 30, shown best in Figure 2 of the drawings, and in dotted lines in Figure 1; said screws 30 being of the type to screw thread into suitable screw threaded sockets (not shown) located in the portion 28 of the housing 10, as will be quite apparent from Figures 1 and 2.

The cap E is recessed at 35 wherein is received the nut 24. The cap wall 36 is provided with an opening 37 to receive the shaft portion 12 therethru with approximately $\tfrac{1}{32}''$ clearance, and the outer face of the wall 36 is provided with a groove 40 of a predetermined width. This groove forms part of the labyrinth way in cooperation with the labyrinth ring F to be subsequently described. The cap has an end extension 41 projecting forwardly beyond the end face of slinger F. Its lower portion terminates in a drain spout 42.

The ring F is provided with a hub portion 50 having a passageway 51 which has a driven fit upon the shaft portion 11, with the inner wall 52 thereof abutting against the shoulder 53 at the juncture of the shaft portions 11 and 12. The ring structure F further has a ring portion 58 lying over the forward end of the shaft portion 12 in a clearance providing spaced relation therewith; this clearance, designated at 56, being preferably $\frac{1}{64}''$. The labyrinth ring furthermore includes a rearwardly extending reduced flange 60 extending into the labyrinth groove 40, with the inner and outer peripheral surfaces and the rear marginal surface thereof spaced from the complementary facing surfaces of the groove 40; the clearance spacing being substantially $\frac{1}{32}''$, as designated by the numeral 62 in Figure 1. The ring F furthermore includes a slinger flange 63 lying within the opening defined by the end portion 41 of the cap E.

Figure 2:
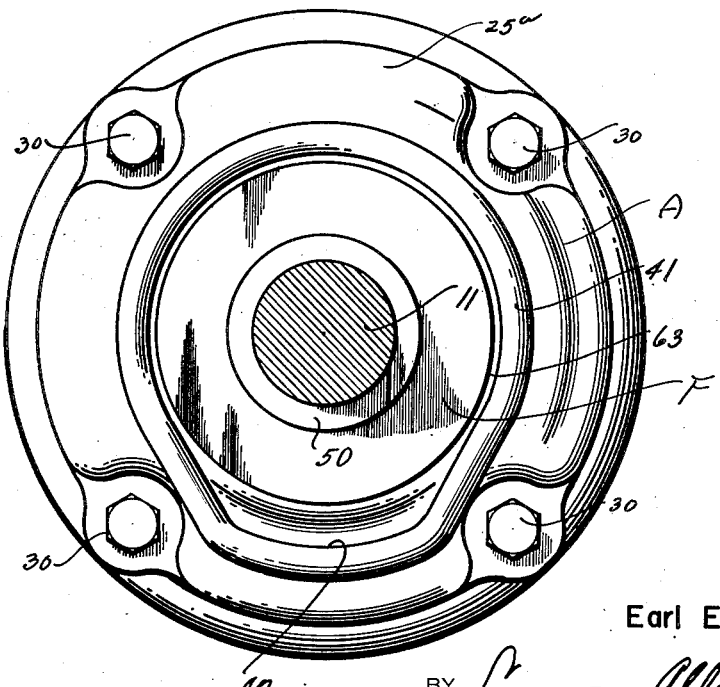
Figure 2 is a front elevation of the bearing.

The lubricant in the housing 10 is normally maintained at the oil level shown by the dot and dash line in Figure 1. Any acid or other fluids creeping along the shaft 11 towards the bearing cap will be centrifugally thrown by the slinger flange 63 into the face opening of the cap E and drain from the spout 42. Any tendency of destructive liquids or debris to enter the bearing structure will be prevented by reason of the tortuous or labyrinth way provided through the spacing of the labyrinth ring and cap with respect to each other and with respect to the shafting portion 12.

Referring to the bearing structure for reduction gear housings and transmission housings as shown in Figures 3 to 5 inclusive, the shaft G includes a driven portion 80; intermediate bearing portions 81 and 81ª, and the rear portion 82. I preferably employ a tapered roller bearing structure H located upon the shaft portion 81ª and within an improved bearing sleeve K mounted within the end wall 84 of a housing L. An end cap M is provided for receiving labyrinth type inner and outer rings N and P in a manner to be subsequently described.

The housing L upon the wall 84 is provided with a bearing hub 85 for detachably receiving the sleeve body 86 therein. The bearing sleeve K which is to be considered part of the cap structure includes an attaching flange 87 adapted to lie over the outer face of the wall 84, as shown in Figure 3. It is attached to the housing by means of the cap screws which also secure the body of the end cap M to the housing.

The bearing H is of the tapered roller type and includes an inner race 88 which has a driven fit upon the portion 81ª of the shaft G, in abutment against the shoulder 89. The tapered rollers 90 have their axes located divergently in the direction of the shaft portion 80 and the outer race 91 thereof is located within the bearing sleeve portion 86, resting against a shoulder 92 provided upon an inwardly extending annular flange 93 thereof. The flange 93 has a reduced shield or baffle flange 94 extending in a plane normal to the axis of the shaft G and spaced from the roller bearing structure H; the same having an opening 95 for receiving the shaft portion 81ª therein, with a clearance of $\frac{1}{16}''$ (designated by numeral 96) shown in Figure 3.

The cap M includes a labyrinth ring receiving body portion 105 having at its rear end the flange 106 adapted to overlie the flange 87 of the bearing sleeve K. Bolts 107, shown in Figure 4, are used to bolt the cap M and sleeve K to the mounting portion 85 of the housing L. A centering extension 110 is annularly provided upon the inner face of the cap M adapted to seat in a suitable complementary recess provided in the flange 87 of the bearing sleeve K, as shown in Figure 3.

An inner labyrinth type lubricant slinger ring N has a sliding fit upon the portion 81 of the shaft, abutting against a shoulder 112 provided at the juncture of the portion 81 and 81ª of the shaft G. The outer labyrinth ring P is provided with a body portion 115 internally screw threaded, counter to direction of shaft rotation, at 116 for screw threading upon the screw threaded portion 117 of the shaft portion 80, and is adapted to hold the ring N against the shoulder 112.

The rings N and P have interfitting flanged connections with the cap, to provide tortuous ways to prevent access of fluids and foreign material into the bearing structure and also leakage of lubricant from the bearing structure. To that end the cap body portion 105 is provided with the inner and outer labyrinth grooves 120 and 121, respectively facing axially of the shaft and adapted to respectively receive the annular flanged portions 122 and 123 of the rings N and P respectively. The outer flanges 122 and 123 face normal to the planes of the body portions of their respective rings, and the rings N and P are furthermore provided with inner flanges 130 and 131 respectively. The flanges 122 and 130 of the ring (N) provide a groove 134 for receiving flange 136 of the bearing cap, and the flanges 123 and 131 define a groove 140 for receiving an end flange 141 of the bearing cap. Thus, the inner structure of the cap M together with the labyrinth rings N and P have interfitting flanges defining a tortuous way between the facing walls thereof which opens into the compartment 100 and also externally of the cap, as is quite obvious from Figure 3 of the drawings. In effect this is a double labyrinth path, the inner way preventing egress of lubricant and the outer way preventing ingress of fluids, etc. In the compartment 100 the ring N further has a slinger flange 152 for the purpose of throwing off lubricant into the space 100. This ring projects beyond the plane of the inner wall 153 of the cap.

Similarly the ring P has a slinger flange 155 on the outer or forward end thereof lying entirely within the opening 156 in the outer end of the cap body 105. Indeed, it is to be noted that the entire labyrinth ring structure N lies within this opening 156.

A modification is shown in Figure 5, since in some cases it may be necessary to provide a nut 160 and lock washer 161 for the purpose of retaining the inner race 88ª of the bearing structure upon the shaft portion 81ᵇ. This bearing structure can be of the type shown, or single or double roller type. Of course in such case the shaft will be screw threaded at 162 to receive the nut 160. Furthermore, the seal or baffle wall 94ª which corresponds to the wall or flange 94 above described for the form of invention shown in Figure 3, will be forwardly sloped. Its clearance opening 95ª is preferably $\frac{1}{16}''$.

The form of invention B utilizes the splash system of lubrication. Oil passes thru the space 96 into the compartment 100 but, of course, drains therefrom thru a lower drain passageway 170 shown in Figure 3 which is extended thru the bearing sleeve and the hub portion of the housing L, as shown. A baffle flange 171 is provided upon the inner wall of the housing in the vicinity of the outlet of drain passageway 170 to prevent lubricant from being splashed up thru the passageway 170.

In connection with the type of bearing structure B, there is more radial and thrust load on the bearing at the coupling end of the shaft, and more oil is constantly received on the bearing. This, of course, lessens the wear upon the parts, as is quite obvious.

Various changes in the shape, size and arrangement of parts may be made to the form of the invention herein shown and described without departing from the spirit of the invention or the scope of the following claims.

I claim:

1. In a bearing structure the combination of a housing, a shaft, a bearing mounted upon the shaft, a housing attaching cap structure having a portion extending into the housing for receiving the bearing therein, and a slinger ring mounted upon said shaft and rotatable therewith disposed at the outer end of said cap structure, said slinger ring and cap structure being provided with interfitting relatively spaced flanges defining a labyrinth passageway to prevent access of external matter to the bearing, and a lubricant shield located at the side of the bearing facing the slinger ring to prevent leakage of lubricant from the housing past said bearing.

2. In a bearing structure the combination of a lubricant receiving housing, a shaft, a bearing structure including an inner race mounted upon the shaft, bearings upon said inner race, and an outer race, a detachable cap structure for the housing including a sleeve fitted into the housing providing an internal seat within which the outer race of the bearing rests, a ring mounted upon said shaft at the outer end of the cap and connected to the shaft for rotation therewith, said cap structure and said ring having interfitting flanges provided with relatively facing spaced surfaces defining a tortuous labyrinth passageway opening externally and internally of said cap.

3. In a bearing structure for pumps and the like the combination of a lubricant receiving housing having an end opening, a shaft including an outer portion, an intermediate larger diametered portion, and an inner portion of greater diameter than the intermediate portion, the junctures of all said portions defining shoulders facing longitudinally of the shaft, a bearing structure including an inner race mounted upon the intermediate shaft portion, a bearing cap including a sleeve portion fitting into the housing end opening, the bearing structure including an outer race fitted into the sleeve of the bearing cap and resting at its outer side against said cap, a seal disc at the outer side of the bearing structure engaging the outer race, means on the shaft to hold the inner race against the shoulder between the intermediate shaft portion and the inner shaft portion, a slinger ring mounted upon the outer shaft portion engaging the shoulder between the outer shaft portion and intermediate shaft portion, said slinger ring and outer wall of the bearing cap having interfitting flanges the surfaces of which are slightly spaced from each other to define a labyrinth passageway opening externally of the cap and into the space between the bearing cap front wall and external periphery of the intermediate shaft portion.

4. In a bearing structure for reduction gear housings and high speed transmission housings the combination of a shaft, a housing having a passageway to receive the shaft therethru, a bearing sleeve detachably mounted in said passageway, an end cap, means detachably mounting the end cap and the bearing sleeve upon the housing, a bearing structure mounted upon said shaft and seated within said bearing sleeve, an inner slinger ring mounted upon said shaft at the inner side of the cap, an outer slinger ring mounted upon the shaft at the outer side of the cap, said cap having a wall portion disposed between said slinger rings, and said wall portion and the slinger rings having interfitting flanges the facing surfaces of which are closely spaced with shallow clearance to provide a tortuous passageway.

5. In a bearing structure the combination of a shaft, a housing having a passageway to receive the shaft therethru, a bearing sleeve detachably mounted in said passageway, an end cap, means detachably mounting the end cap and the bearing sleeve upon the housing, a bearing structure mounted upon said shaft and seated within said bearing sleeve, an inner slinger ring mounted upon said shaft at the inner side of the cap, an outer slinger ring mounted upon the shaft at the outer side of the cap, said cap having a wall portion disposed between said slinger rings, and said wall portion and the slinger rings having interfitting flanges the facing surfaces of which are closely spaced with shallow clearances to provide a tortuous passageway, opening into the bearing sleeve and also externally of said cap.

6. In a bearing structure the combination of a shaft, a housing having a passageway to receive the shaft therethru, a bearing sleeve detachably mounted in said passageway, an end cap, means detachably mounting the end cap and the bearing sleeve upon the housing, a bearing structure mounted upon said shaft and seated within said bearing sleeve, an inner slinger ring mounted upon said shaft at the inner side of the cap, an outer slinger ring mounted upon the shaft at the outer side of the cap, said cap having a wall portion disposed between said slinger rings, and said wall portion and the slinger rings having interfitting flanges the facing surfaces of which are closely spaced with shallow clearances to provide a tortuous passageway, said sleeve having an annular lubricant baffle flange disposed therein immediately at the outer side of the bearing structure which is spaced from the bearing cap and inner slinger ring, said baffle flange having a passageway therethru slightly clearing said shaft to provide a shallow lubricant passageway between the bearing structure and the space between the baffle flange and cap and inner slinger ring.

7. In a bearing structure the combination of a shaft, a housing having a passageway to receive the shaft therethru, a bearing sleeve detachably mounted in said passageway, an end cap, means detachably mounting the end cap and the bearing sleeve upon the housing, a bearing structure mounted upon said shaft and seated within said bearing sleeve, an inner slinger ring mounted upon said shaft at the inner side of the cap, an outer slinger ring mounted upon the shaft at the outer side of the cap, said cap having a wall portion disposed between said slinger rings, and said wall portion and the slinger rings having interfitting flanges the facing surfaces of which are closely spaced with shallow clearances to provide a tortuous passageway, the labyrinth passageway having external and internal opening to said housing.

8. In a bearing structure the combination of a shaft having outer, inner and intermediate shaft portions of different diameters defining outwardly facing shoulders at the junctures thereof, a housing having a shaft receiving passageway therethru, a detachable bearing sleeve mounted in said passageway having an internal annular flange intermediate the ends thereof, a bearing structure mounted upon the intermediate part of said shaft resting against the shoulder between the intermediate and inner portions of said shaft and supported within the bearing sleeve in partial spaced relation with respect to the said flange, said flange having a passageway for receiving the intermediate shaft portion with a slight lubricant passageway clearance, an end cap, means detachably connecting the end cap and bearing sleeve to the housing, an inner ring having a sliding fit on the outer portion of the shaft in engagement with the shoulder between the outer and intermediate shaft portions, an outer ring having a threaded engagement with the outer shaft portion and engaging the inner ring to force it against the last mentioned shoulder, said cap having a wall portion between the said rings, and said rings and said cap wall portion having interfitting flanges the surfaces of which are in slightly spaced relation to provide a tortuous labyrinth type passageway which opens externally of the cap and internally within said bearing sleeve.

9. In a bearing structure the combination of a shaft having outer, inner and intermediate shaft portions of different diameters defining outwardly facing shoulders at the junctures thereof, a housing having a shaft receiving passageway therethru, a detachable bearing sleeve mounted in said passageway having an internal annular flange intermediate the ends thereof, a bearing structure mounted upon the intermediate part of said shaft resting against the shoulder between the intermediate and inner portions of said shaft and supported within the bearing sleeve in partial spaced relation with respect to the said flange, said flange having a passageway for receiving the intermediate shaft portion with a slight lubricant passageway clearance, an end cap, means detachably connecting the end cap and bearing sleeve to the housing, an inner ring having a sliding fit on the outer portion of the shaft in engagement with the shoulder between the outer and intermediate shaft portions, an outer ring having a threaded engagement with the outer shaft portion and engaging the inner ring to force it against the last mentioned shoulder, said cap having a wall portion between the said rings, and said rings and said cap wall portion having interfitting flanges the surfaces of which are in slightly spaced relation to provide a tortuous labyrinth type passageway which opens externally of the cap and internally within said bearing sleeve, said rings having inner and outer slinger flanges thereon.

10. In a bearing structure the combination of a shaft having outer, inner and intermediate shaft portions of different diameters defining outwardly facing shoulders at the junctures thereof, a housing having a shaft receiving passageway therethru, a detachable bearing sleeve mounted in said passageway having an internal annular flange intermediate the ends thereof, a bearing structure mounted upon the intermediate part of said shaft resting against the shoulder between the intermediate and inner portions of said shaft and supported within the bearing sleeve in partial spaced relation with respect to the said flange, said flange having a passageway for receiving the intermediate shaft portion with a slight lubricant passageway clearance, an end cap, means detachably connecting the end cap and bearing sleeve to the housing, an inner ring having a sliding fit on the outer portion of the shaft in engagement with the shoulder between the outer and intermediate shaft portions, an outer ring having a threaded engagement with the outer shaft portion and engaging the inner ring to force it against the last mentioned shoulder, said cap having a wall portion between the said rings, and said rings and said cap wall portion having interfitting flanges the surfaces of which are in slightly spaced relation to provide a tortuous labyrinth type passageway which opens externally of the cap and internally within said bearing sleeve, said rings having inner and outer slinger flanges thereon, and said bearing sleeve and housing having a lubricant drain passageway at the lower portion opening into the space between the inner slinger ring and the baffle flange and into the housing below the bearing structure.

11. In a bearing structure the combination of a shaft having outer, inner and intermediate shaft portions of different diameters defining outwardly facing shoulders at the junctures thereof, a housing having a shaft receiving passageway therethru, a detachable bearing sleeve mounted in said passageway having an internal annular flange intermediate the ends thereof, a bearing structure mounted upon the intermediate part of said shaft resting against the shoulder between the intermediate and inner portions of said shaft and supported within the bearing sleeve in partial spaced relation with respect to the said flange, said flange having a passageway for receiving the intermediate shaft portion with a slight lubricant passageway clearance, an end cap, means detachably connecting the end cap and bearing sleeve to the housing, an inner ring having a sliding fit on the outer portion of the shaft in engagement with the shoulder between the outer and intermediate shaft portions, an outer ring having a threaded engagement with the outer shaft portion and engaging the inner ring to force it against the last mentioned shoulder, said cap having a wall portion between the said rings, and said rings and said cap wall portion having interfitting flanges the surfaces of which are in slightly spaced relation to provide a tortuous labyrinth type passageway which opens externally of the cap and internally within said bearing sleeve, said rings having inner and outer slinger flanges thereon, and said bearing sleeve and housing having a lubricant drain passageway at the lower portion opening into the space between the inner slinger ring and the baffle flange and into the housing below the bearing structure, and a baffle upon said housing to prevent lubricant from entering the lower portion of said drain passageway.

12. In a bearing structure the combination of a shaft, a housing having a shaft receiving passageway therethru, a detachable bearing sleeve mounted in said bearing shaft passageway, an end shaft, means detachably connecting the end shaft and bearing sleeve upon said housing, said bearing sleeve having an internal annular flange dividing the bearing sleeve into a forward compartment facing within the housing and an outer compartment facing said cap, a bearing structure mounted upon the shaft and upon the bearing sleeve within the housing facing compartment of the bearing sleeve, the said bearing sleeve flange having a slight clearance between the surface thereof facing the shaft to provide a lubricant passageway between the two compartments provided by the bearing sleeve, and means providing a drain passageway from the compartment between the said flange and the cap for lubricant return to the housing.

13. In a bearing structure the combination of a shaft, a housing having a shaft receiving passageway therethru, a detachable bearing sleeve mounted in said bearing shaft passageway, an end shaft, means detachably connecting the end shaft and bearing sleeve upon said housing, said bearing sleeve having an internal annular flange dividing the bearing sleeve into a forward compartment facing within the housing and an outer compartment facing said cap, a bearing structure mounted upon the shaft and upon the bearing sleeve within the housing facing compartment of the bearing sleeve, the said bearing sleeve flange having a slight clearance between the surface thereof facing the shaft to provide a lubricant passageway between the two compartments provided by the bearing sleeve, and means providing a drain passageway from the compartment between the said flange and the cap for lubricant return to the housing, and slinger ring means associated with the cap upon the housing providing internal and external slinger flanges.

14. In a bearing structure the combination of a shaft, a housing having a passageway thru which the shaft extends, a bearing sleeve mounted in said passageway, means for attaching the bearing sleeve to the housing, a bearing structure mounted upon the shaft and within the bearing sleeve including an inner race, said shaft being provided with a shoulder to receive the inner end of said race, a nut screw threaded upon said shaft engaging the outer end of the inner race to clamp the same against said shoulder, said bearing sleeve having a baffle wall internally thereof at the outer side of the bearing structure and beyond said nut having a passageway the walls of which slightly clear the shaft to define a lubricant way, and means at the outer end of said bearing sleeve associated with said shaft to prevent external loss of lubricant and prevent internal admission of matter to the bearing structure.

15. In a bearing structure the combination of a housing, a shaft, a bearing structure including an inner race, bearing elements and an outer race, means securing the inner race upon said shaft, an end cap detachably secured to the housing having an inwardly extending hub against which the outer side of the outer race engages, said hub being externally screw threaded, and a sleeve threaded upon said hub threads and within which the outer periphery of the outer race rests, said sleeve having an inwardly extending flange against which the inner side of the outer race rests, to hold said outer race in position.

16. In a bearing structure the combination of a housing, a shaft, a bearing mounted upon the shaft, a housing attaching cap structure externally of the housing having a portion secured thereto extending into the housing for receiving the bearing therein, and a slinger ring mounted upon said shaft and rotatable therewith disposed at the outer end of said cap structure, said slinger ring and cap structure being provided with inter-fitting relatively spaced flanges defining a labyrinth passageway to prevent access of external matter to the bearing.

17. In a bearing structure the combination of a housing, a shaft, a bearing in the housing mounted upon the shaft, a housing attaching cap structure connected to the housing and surrounding said shaft, said shaft having thereon an annular shoulder facing longitudinally of the shaft in the direction of said cap structure, and a slinger ring mounted upon said shaft and rotatable therewith and engaged against said annular shoulder, said slinger ring being disposed within the cap structure, and said slinger ring and said cap structure being provided with inter-fitting relatively spaced flanges defining a labyrinth passageway to prevent access of external matter to the bearing.

18. In a bearing structure the combination of a housing, a shaft, a bearing mounted upon said shaft and within said housing, a housing attaching cap structure detachably connected to said housing having an outer end flanged extension projecting parallel with the axis of the shaft, and a slinger ring mounted upon said shaft and rotatable therewith and disposed between the shaft and the inner surface of said flange, the outer surface of the slinger ring being entirely exposed longitudinally of the shaft and unobstructed by said housing flanged extension, said slinger ring and cap structure being provided with inter-fitting relatively spaced flanges defining a labyrinth passageway to prevent access of external matter to the bearing.

19. In a bearing structure the combination of a housing having a passageway therein, a shaft rotatably disposed in said housing and spaced from the walls of said passageway, a bearing mounted upon said shaft, a housing attaching cap structure having a sleeve portion connected therewith disposed in engagement within the passageway of the housing and internally thereof supporting said bearing, said housing attaching cap structure including a cap body connected to said sleeve, means in said housing attaching cap structure to baffle the flow of lubricant from the outer side of said bearing, said cap body at the outer end thereof having an annular flange extending parallel to the axis of the shaft and defining a chamber therein, a slinger ring mounted upon said shaft for rotation therewith and disposed within said chamber of the cap body, said slinger ring and cap body being provided with inter-fitting relatively spaced flanges defining a labyrinth passageway to prevent access of external matter to the bearing.

EARL E. BROWN.

REFERENCES CITED

The following references are of record in the file of this patent:

UNITED STATES PATENTS

| Number | Name | Date |
| --- | --- | --- |
| Re. 20,747 | Simpson | May 31, 1938 |
| 1,580,701 | Travers | Apr. 13, 1926 |
| 1,872,251 | Cowin | Aug. 16, 1932 |
| 1,910,664 | Adams | May 23, 1933 |
| 1,918,988 | Searles | July 18, 1933 |
| 1,946,431 | Vile | Feb. 6, 1934 |
| 2,000,581 | Coffin | May 7, 1935 |
| 2,281,905 | Young | May 5, 1942 |